United States Patent
Bazzinotti et al.

(10) Patent No.: US 7,720,942 B2
(45) Date of Patent: May 18, 2010

(54) METHOD AND APPARATUS PROVIDING VIRTUAL PRIVATE NETWORK ACCESS

(75) Inventors: John Bazzinotti, Norwood, MA (US); Peter Davis, Wakefield, MA (US); Victor Volpe, Groton, MA (US); Rashmi Pitre, Shrewsbury, MA (US); Keith Mader, Raynham, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/283,717

(22) Filed: Sep. 15, 2008

(65) Prior Publication Data
US 2009/0031404 A1    Jan. 29, 2009

Related U.S. Application Data

(63) Continuation of application No. 10/282,503, filed on Oct. 29, 2002, now Pat. No. 7,444,415.

(60) Provisional application No. 60/369,280, filed on Apr. 2, 2002.

(51) Int. Cl.
*G06F 15/177* (2006.01)

(52) U.S. Cl. ........................ 709/221; 709/220; 709/227; 709/228; 709/229

(58) Field of Classification Search .................. 709/220, 709/221, 227–229
See application file for complete search history.

(56) References Cited

U.S. PATENT DOCUMENTS

| | | | | |
|---|---|---|---|---|
| 6,996,628 | B2* | 2/2006 | Keane et al. | 709/238 |
| 7,010,604 | B1* | 3/2006 | Munger et al. | 709/227 |
| 7,505,421 | B2* | 3/2009 | Nagy et al. | 370/254 |
| 2002/0129271 | A1* | 9/2002 | Stanaway et al. | 713/201 |
| 2002/0138623 | A1* | 9/2002 | Boden et al. | 709/227 |
| 2003/0093563 | A1* | 5/2003 | Young et al. | 709/245 |
| 2003/0191799 | A1* | 10/2003 | Araujo et al. | 709/203 |
| 2004/0003116 | A1* | 1/2004 | Munger et al. | 709/245 |
| 2004/0098485 | A1* | 5/2004 | Larson et al. | 709/227 |
| 2004/0107286 | A1* | 6/2004 | Larson et al. | 709/229 |
| 2005/0022012 | A1* | 1/2005 | Bluestone et al. | 713/201 |
| 2006/0070122 | A1* | 3/2006 | Bellovin | 726/14 |
| 2006/0206934 | A1* | 9/2006 | Ammirata | 726/15 |
| 2009/0144817 | A1* | 6/2009 | Kumar et al. | 726/12 |

* cited by examiner

*Primary Examiner*—Nathan Flynn
*Assistant Examiner*—Mohamed Wasel
(74) *Attorney, Agent, or Firm*—Patterson & Sheridan, LLP

(57) ABSTRACT

A virtual private network device enables individual machines at a remote subnet to be visible and addressable from a central site by establishing a private address range for the remote machines, forming a virtual private network tunnel from the virtual private network device to the central site, and communicating the private address range to the central site to enable connections from the central site to individual machines on the remote subnet.

10 Claims, 5 Drawing Sheets

METHOD AND APPARATUS PROVIDING VIRTUAL PRIVATE NETWORK ACCESS

CROSS-REFERENCE TO RELATED APPLICATIONS

This is a continuation of U.S. patent application Ser. No. 10/282,503 (now U.S. Pat. No. 7,444,415) entitled "METHOD AND APPARATUS PROVIDING VIRTUAL PRIVATE NETWORK ACCESS," filed Oct. 29, 2002, by Bazzinotti, et al., which claims benefit of U.S. provisional patent application serial number 60/369,280 entitled "METHOD AND APPARATUS FOR OPERATING A VIRTUAL PRIVATE NETWORK" filed on Apr. 2, 2002, by Bazzinotti et al., and assigned to the present assignee.

BACKGROUND OF THE INVENTION

Remote access is the ability to log on to a computer network from a "remote" location. Remote does not refer to physical distance, but rather locations that are not part of a configured network. One conventional form of remote access is the virtual private network (VPN). A VPN is a type of private network constructed by using public network infrastructure to connect divergent network nodes. Basically, a VPN is a private network that uses a public network (usually the Internet) to connect remote sites or users together. Instead of using a dedicated, physical connection such as a leased line, a VPN uses "virtual" connections routed through the Internet from, for example, a company's private central network to a remote site or to a remote employee on the road or working from home. VPNs are constructed to operate over a public network typically through the use of a combination of data encapsulation, data encryption and user authentication.

A variety of mechanisms are used to provide network security for access and data integrity in a VPN. VPNs may use either symmetric-key encryption or public key encryption. A protocol commonly used in VPNs is IPsec. IPsec, which stands for Internet Protocol Security, is a set of protocols developed by the Internet Engineering Task Force to implement VPNs. IPsec supports the secure exchange of data packets at the Internet Protocol (IP) network layer. IPsec supports two encryption modes: transport, and tunnel. Transport mode encrypts only the data portion, that is, the payload, of each packet, but leaves the header untouched. Tunnel mode is more secure as it encrypts both the header and the payload. In tunneling, the packet to be sent to the central network is encapsulated within another packet and is then sent over the VPN connection to the central site. On the receiving side, an IPsec-compliant device decrypts each packet. In IPsec, the sending and receiving devices share a public key. IPsec uses a protocol called Internet Security Association and Key Management Protocol/Oakley (ISAKMP/Oakley), which allows the receiver to obtain a public key and authenticate the sender using digital certificates.

VPNs are frequently used to connect a central computer site with one or more remote computer sites. This type of VPN is called a remote-access VPN. One of the several types of remote-access VPN environments in the current art involves using a client application at the remote site. The client application may be a software client application or a hardware client application.

The general configuration for VPNs using a software client application involves installing client software on each remote computer. A typical example of a VPN in which a software client device is employed is a home-office computer or a laptop of a mobile worker. In a typical software client deployment, the VPN client software is installed on the computer and the client computer connects to the central site via a telephone connection or an Internet Service Provider connection to the Internet. The VPN software client establishes a secure encrypted tunnel from the client device to the central site over the Internet. Access and authorization to the central site are controlled from the central site. After the client computer is authenticated, the client computer receives IP parameters such as a virtual IP address that is used for VPN traffic and the location of domain name servers.

An example of a hardware client application is a VPN client device residing at the remote site connecting a plurality of remote computer devices, called stations, to the central site. An example of a remote site that might use a hardware client is a small remote office connected to a main office. Another example of a remote site connected to a central site using a VPN is a group of cash registers in a remote facility networked to a central site. Printers and other output devices can also be networked in a VPN in order to be remotely controlled from a central site. The individual stations connected to the hardware client do not need to have client software in order to access the VPN through the hardware client. The client device, i.e., the hardware client, after authentication, receives an IP address that is used for VPN traffic. The client stations behind the hardware client appear as a single user on the central site through the use of many-to-one network address translation (NAT).

SUMMARY OF THE INVENTION

Current VPN technology to allow access to client computer systems does not configure easily or scale well. Software clients must be loaded onto individual machines and configured accordingly. The software client and the operating system of the individual machine must be compatible which presents problems where there are networks of computers with different operating systems or even different versions of the same operating system. Supporting large networks of software clients is also difficult. Hardware devices provide solutions to the problems of installing software in individual machines and supporting individual machines, however, hardware clients introduce network configuration problems. In order to access the central site, the hardware client's subnet needs to be configured with each device. When additional client machines are added, the subnet may require reconfiguration. Reconfiguration can be difficult when adding subnets to a network controlled by a central site particularly where the remote stations, such as cash registers, do not have the capability of authenticating. Embodiments of the present invention significantly overcome such deficiencies and provide mechanisms and techniques for a VPN device operating in network extension mode.

Embodiments of the invention provide methods and apparatus for a VPN device in network extension mode that enables individual machines (stations) at a remote network site to be visible and addressable from a central network site. The VPN device has a preconfigured default set of IP addresses to assign to the stations on its subnet. Theses default addresses are the same across all VPN devices and therefore must be adjusted during configuration of the VPN device. Configuration of the VPN device involves adjusting the default IP addresses to differentiate them from other VPN devices and their subnets also networked into the same central site. When the VPN device is installed after the preconfigured set of IP addresses is adjusted, the VPN device uses its DHCP server to assign the adjusted IP addresses to the remote stations on the VPN device's subnet. After authentication of the VPN device to the central site, each station on the remote network is addressable from the central site using the assigned IP address thereby forming an extended network.

In another embodiment of the invention, the VPN device is installed in an existing subnet. In this embodiment, the VPN device is assigned, by the installer, an IP address for use in the existing subnet. The devices in the existing subnet had routable IP addresses assigned before the VPN device was installed. The address assigned to the VPN device is a private IP address for use at the private interface between the VPN device and the stations. In another embodiment of the invention, the step of establishing a private address range further comprises using a default address range stored in the VPN device. In a further embodiment of the invention, the step of establishing a private address range further comprises using the range of addresses pre-assigned to the at least one client station. In this way, the VPN device is easily deployed in an existing network.

Another embodiment comprises establishing a private address range to be used for address assignment between the VPN device, also called the private interface device, and at least one machine on the VPN device's subnet, a client station. The method then establishes a virtual private network tunnel between the VPN device and a concentrator at a central site. The method then communicates the private address range to the concentrator and enables connections from the concentrator through the VPN device to the at least one client station. In this way, the client station is individually addressable from the central site and at the same time, not addressable from the public network over which the VPN operates.

In another embodiment of the invention, the step of establishing a virtual private network tunnel further comprises providing a public address of the VPN device for access from a public network and providing a private address of the VPN device for the virtual private network tunnel. Thus, the stations on the subnet are secure from the public network.

In another embodiment of the invention, the step of establishing a virtual private network tunnel further comprises providing a group name and a group password for verification of the VPN device to the central site and providing a user name and a user password for verification of the at least one remote client station. The two-layers of authentication increase security enabling the VPN device to keep the tunnel to the network open while maintaining security against unauthorized users. In this way, the central network is safeguarded against false VPN devices attempting to connect to the central site.

In another embodiment of the invention, the method further comprises comparing the private address range to a stored profile for validation of the VPN device and its subnet. In this way, the VPN device is protected from misconfiguration of the private address range.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

A VPN device in network extension mode enables individual machines (stations) at a remote network site to be visible and addressable from a central network site. Embodiments of the invention provide methods and apparatus for a VPN device in network extension mode that enables individual machines (stations) at a remote network site to be visible and addressable from a central network site. The VPN device has a preconfigured set of IP addresses to assign to the stations on its subnet. Configuration of the VPN device involves adjusting the IP addresses to differentiate them from other VPN devices and their subnets also networking in to same central site. When the VPN device is installed and the preconfigured set of IP addresses is adjusted, the VPN device uses its DHCP server to assign addresses to the stations. After authentication of the VPN device to the central site, each station on the remote network is addressable from the central site using the assigned IP address forming an extended network. In an alternative embodiment of the invention, the VPN device is installed in an existing subnet. In this embodiment, the VPN device is assigned, by the installer, a private IP address for use at the private interface in the existing subnet.

Figure 1:
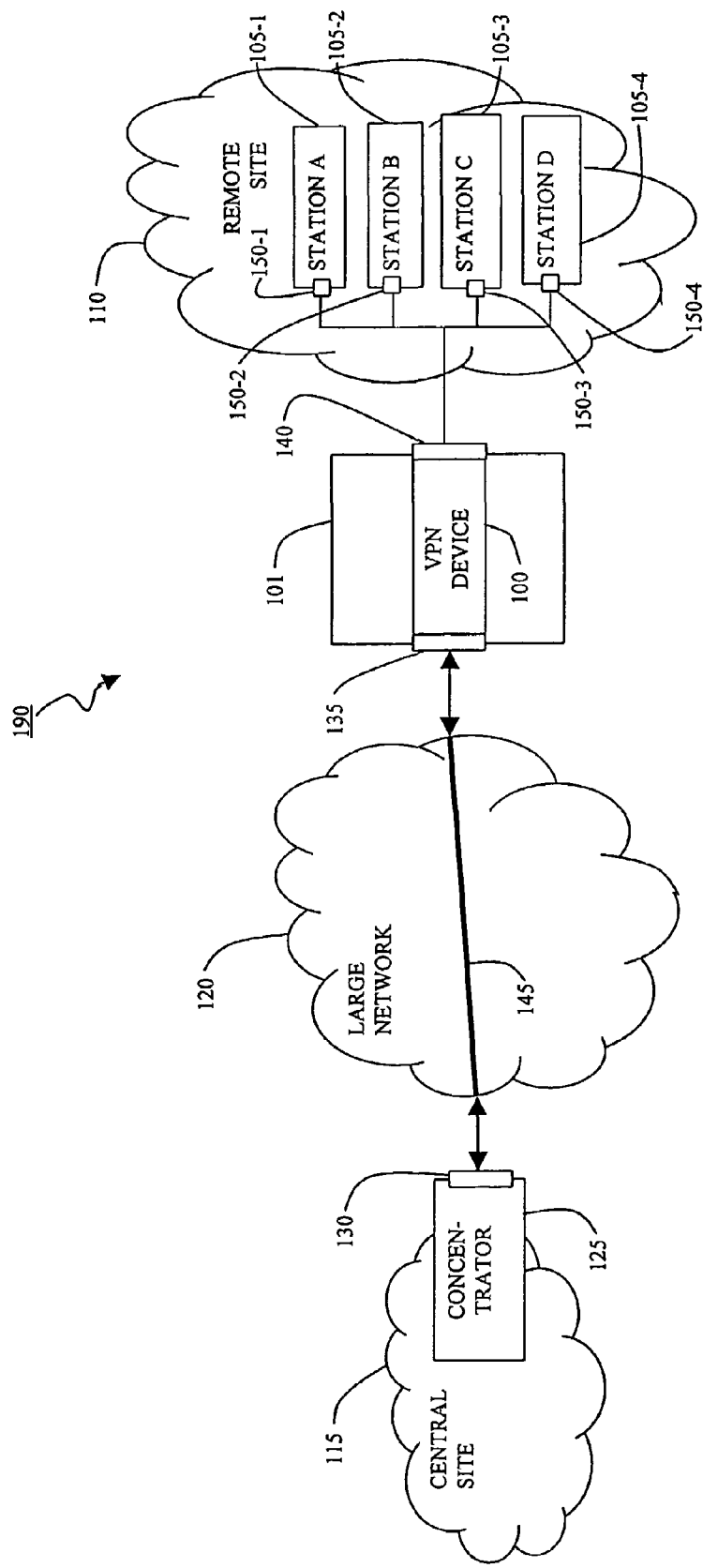
FIG. 1 is a block diagram of an example networked computer system environment including a data communications device configured to operate a VPN device according to the principles of the present invention.

FIG. 1 shows a block diagram of an example networked computer system environment 190 including a data communications device 101 configured to operate a VPN device 100 according to principles of the invention. The data communications device 101 operating the VPN device 100 connects a plurality of stations 105 at a remote network site 110 to a central site 115. The plurality of stations 105 are, for example, computers, or any type of networkable computerized device such as cash registers or printers. The data communications device 101 may be any type of computer device such as a router, a hub, a gateway, etc. The VPN device 100 can be implemented as software, a combination of software and hardware or hardware.

Functionally, in this example, the plurality of client stations 105 and the data communications device 101 operating the VPN device 100 are connected to a large network 120 such as the Internet. The central site network 115 is also connected to the large network 120 using a concentrator 125 as the interface to the large network 120. The concentrator 125 has a concentrator IP address 130, e.g. a network interface, by which it is identified on the large network 120. The VPN device 100 maintains two IP addresses, a public IP address 135 by which the VPN device 100 is identified on the large network 120, and a private IP address 140 which will be discussed below. Each client station 105 on the remote network 110 has an IP address 150 as will be described below.

In operation, the central site 115 and the VPN device 100 establish a VPN 145 in which the VPN device 100 operates in network extension mode as will be explained herein to allow direct access between the central site 115 and the client stations 105. In network extension mode, the VPN device 100 initiates a single tunnel to the central site, receives policy pushed from the central site 115. The VPN device 100 is known on the VPN 145 by its private IP address 140.

The VPN device 100 operating in network extension mode resembles LAN-to-LAN operation and enables network administrators at the central site 115 to have visibility into the network behind the VPN device 100, that is, into the remote computer site 110. By "visibility" what is generally meant is that in network extension mode, all stations 115 on the VPN device's private network 110 are uniquely addressable via the tunnel 145 from the central site 115. Thus, the stations 105 at the remote site 110 are addressable from the central site 115 but they are not addressable from the large network 120. This enables direct access to devices, i.e. the stations, behind the VPN device 100 and also enables support of applications which use dynamically numbered ports, like FTP to each station 105.

Figure 2:
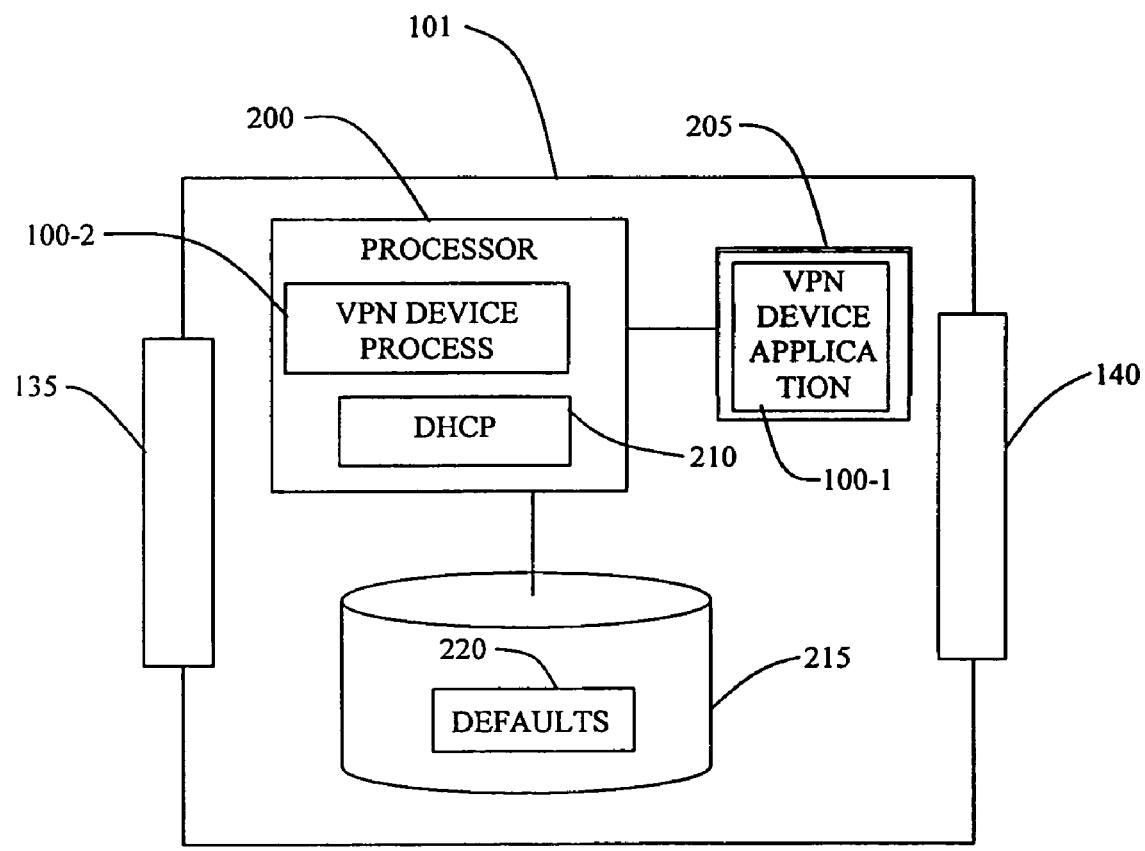
FIG. 2 is a block diagram of the data communications device configured to operate the VPN device of FIG. 1.

FIG. 2 is a block diagram of the data communications device 101 configured VPN device 100 of FIG. 1. The data communications device 101 has a processor 200 connected to a memory 205 including a VPN device application 100-1, and a database 215. The processor 200 includes a VPN device process 100-2 and a Dynamic Host Configuration Protocol (DHCP) server 210. Generally, in operation, the DHCP server 210 is for assigning addresses to the stations 105 at the remote site 110. In one embodiment, the data communications device 101 stores a set of default IP addresses 220 in the database 215. The default IP addresses 220 include the private IP address 140 of the VPN device 100, for use at the private interface between the VPN device 100 and the remote stations 105, and at least one remote station IP address 150 for the stations 105 on the remote network 110. The VPN device public address 135, private address 140 and station addresses 150 are all configurable and can be changed upon installation in a network. The public address 135 is typically provided by an ISP through which the VPN device 100 accesses the Internet. The private address 140 and remote station IP addresses 150 are configured by the installer of the VPN device 100. If the VPN device 100 is to be installed into a new network where the stations do not have pre-assigned IP addresses, the installer adjusts the range of default addresses 220 stored in the VPN device 100 to make the VPN device 100 and stations 105 unique from other VPN devices and their subnets. Under direction of the VPN device 100, the DHCP server 210 assigns the reconfigured IP addresses to stations 105 on the remote network 110. If the VPN device 100 is to be installed in an existing remote network 110 where the stations 105 are already assigned IP addresses 150, the installer disables the DHCP server 215 the installer assigns a private IP address 140 to the VPN device 100 in keeping with the IP addresses 150 in the existing remote network 110. The remote stations 105 retain the IP addresses 150 already assigned to them in the existing remote network 110.

Figure 3:
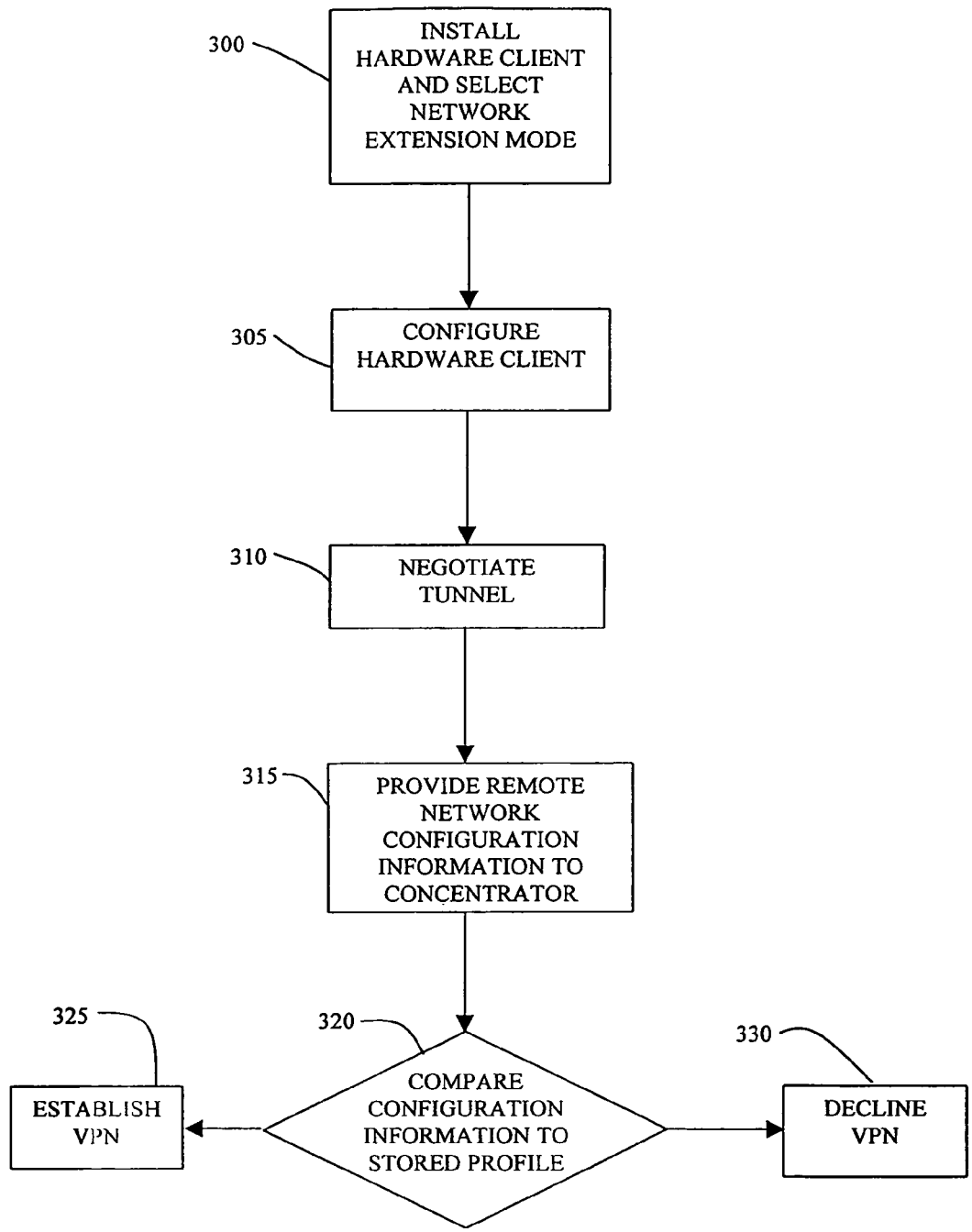
FIG. 3 is a flow chart of the installation and configuration of the VPN device of FIG. 1.

FIG. 3 is a flow chart of the process of installing and initializing the VPN device 100 of FIG. 1. In step 300, the data communications device 101 operating the VPN device 100 is installed in a network configuration similar to FIG. 1 where the data communications device 101 connects a plurality of stations 105 at a remote network 110 to the Internet 120. Further in step 300, the installer configures the VPN device 100 top operate in the network extension mode.

In step 305, the installer then configures the VPN device 100. The parameters to be configured are: private IP address 140 of the VPN device 100, IP address of the concentrator 130 at the central site 115, a group name and group password for the VPN device 100 and a user name and a user password for user access through the VPN device 100. The installer provides the concentrator IP address 130, group name and group password, user name and user password. The private IP address 140 and IP addresses 150 for the stations 105 depend on the existing network configuration. If the VPN device 100 is installed into a network where the remote stations 105 do not already have assigned IP addresses, the installer provides the private IP address 140 to the VPN device 100 and adjusts the default range of IP addresses stored in the VPN device 100 to make them unique from addresses used by other VPN devices. The VPN device 100, when activated, uses its DHCP server 215 to assign IP addresses from the stored defaults to the stations 105 on the remote site 110. If the VPN device 100 is installed into a network where the remote stations already have IP addresses, the installer provides the private IP address 140 to the VPN device 100 and disables the DHCP server 215.

In step 310, the VPN device 100 then negotiates a VPN tunnel 145 to the central site 115 through the large network 120. The VPN device 100 obtains its public IP address 135 from the ISP or other provider of Internet access. The VPN device 100 then sends data to the concentrator 125 to begin the process of setting up a VPN using a protocol such as IPsec.

In step 315, once the VPN device 100 has a tunnel to the concentrator 125, the VPN device 100 provides the central site 115 the network information. That is, the VPN device 100 gives the central site 115 the private address 140 of the VPN device 100 and the IP addresses 150 of the stations 105 at the remote site 110.

In step 320, the concentrator 125 then compares the parameters provided by the VPN device 100 with a profile stored at the central site 115.

In step 325, if the parameters match the stored profile, the VPN 145 to the VPN device 100 is established.

In step 330, if the parameters do not match the stored profile, the central site 115 declines to form a VPN with the VPN device 100.

Figure 4:
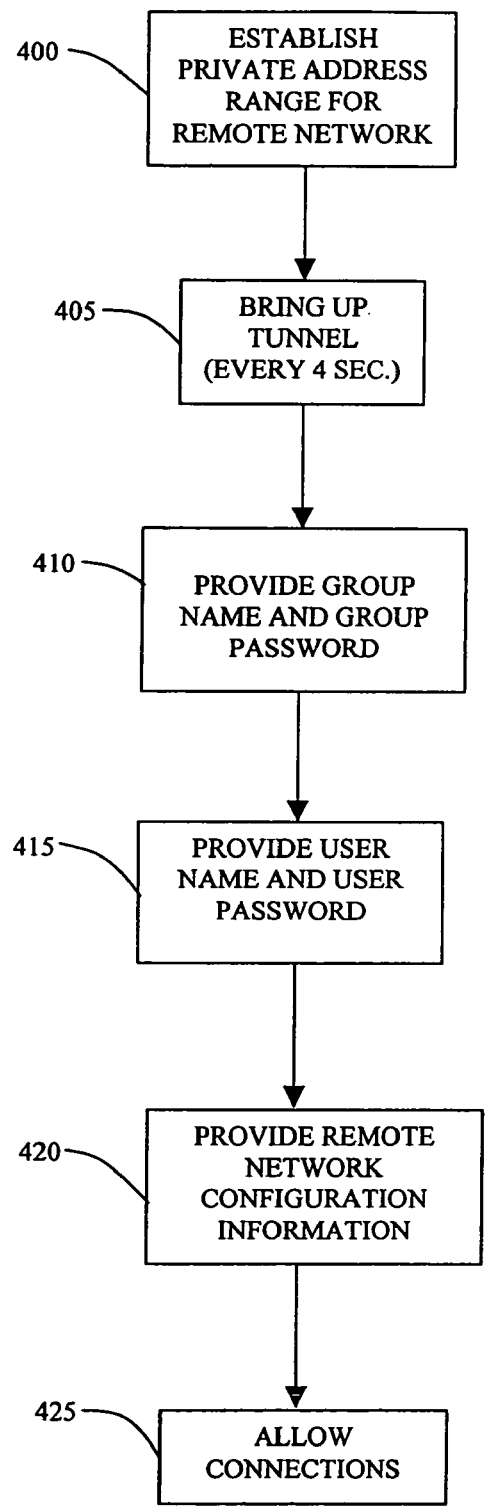
FIG. 4 is a flow chart of the operation of the VPN device of FIG. 1.

FIG. 4 is a flow chart of the operation of the VPN device 100. In step 400, as described above, the VPN device 100, when it is installed, establishes a private IP address range including a private IP address 140 for the VPN client 100 and addresses 150 for the remote stations 105 on the remote network 110.

In step 405, the VPN client 100 then attempts to establish a VPN 145 with the central site 115. Generally, if the VPN tunnel 145 is down, the VPN client 100 attempts every four seconds to bring the tunnel 145 up. If the tunnel 145 is up, the VPN client 100 is continually maintaining that connection.

In step 410, as part of establishing itself as a client to the remote site 115, the VPN client 100 provides the concentrator 125 with a group name and a group password.

In step 415, the VPN device 100 then provides a user name and a user password to the concentrator 125.

In step 420, the VPN client 100 then provides the remote network configuration information to the concentrator 125. The remote network configuration information includes the private address 140 of the VPN device 100 and the IP addresses 150 of the remote stations 105. For example, if the IPsec protocols are used, during phase 2 of IPsec negotiation, the VPN device indicates its private IP address, or "mask" to the concentrator 125.

The concentrator 125, at this point, can optionally compare the provided remote network information to attributes in a stored profile to check the validity of the VPN device 100. This validity check can provide the central site some control over the networks that VPN devices can claim.

In step 425, once the VPN device 100 has established the VPN 145 and provided the remote network information to the concentrator 125, the VPN device 100 is established as a client of the central site 115 and it allows connections from the central site 115 to the stations 105 of the remote network 110.

Figure 5:
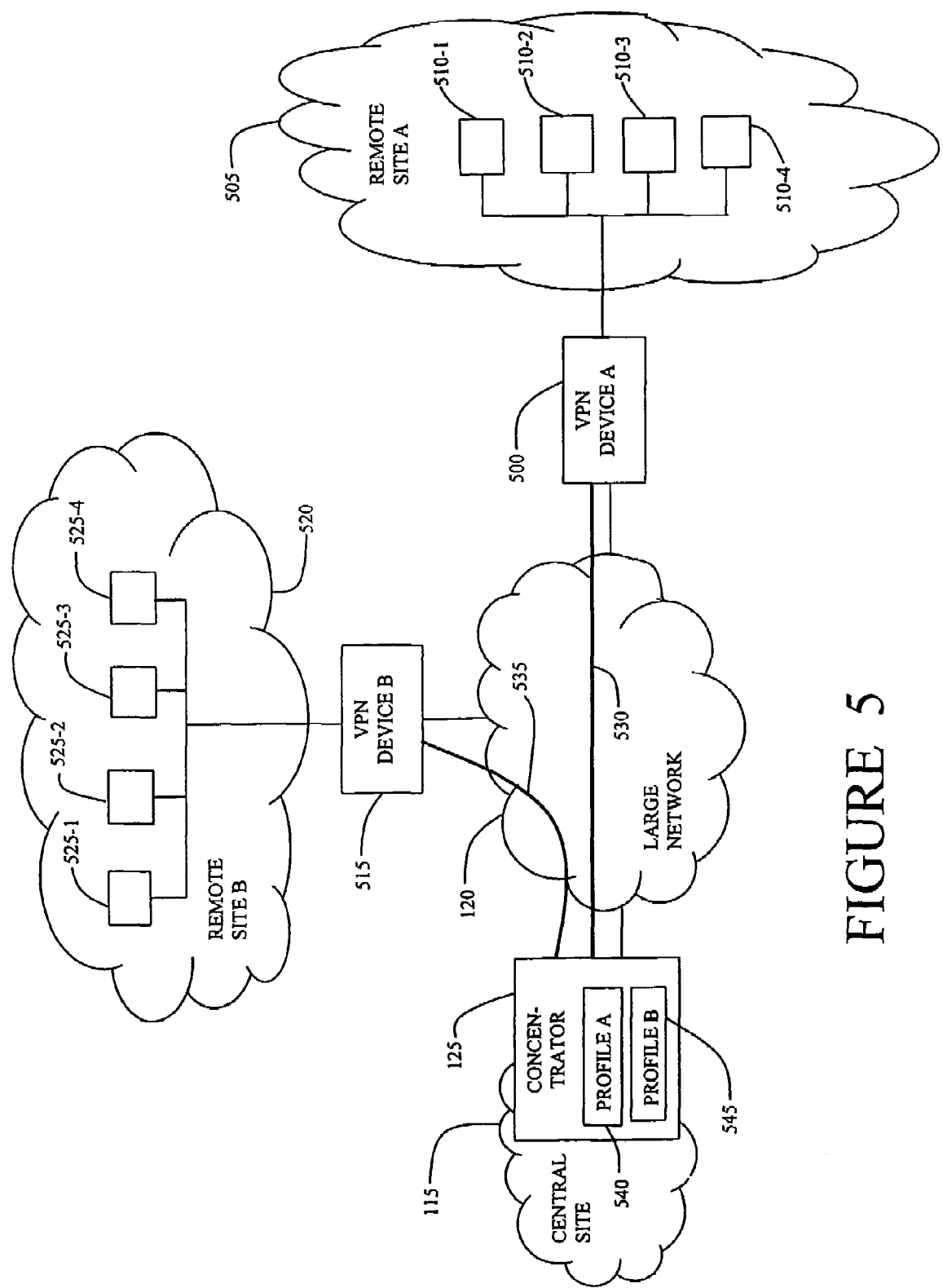
FIG. 5 is a block diagram of a computer system including a plurality of VPN devices according to principles of the invention.

FIG. 5 is a block diagram of a computer network including a plurality of VPN devices according to the principles of the present invention. VPN device A 500 connects a first plurality of stations 510 at a remote network site A 505 to the central site 115. VPN device B 515 connects a second plurality of stations 525 at a remote network site B 520 to the central site 115. The first plurality of stations 510 and the second plurality of stations 525 are, for example, computers, or any type of networkable computerized device such as cash registers or printers.

Functionally, the first plurality of stations 510 and the second plurality of stations 525 and the VPN devices 500, 515 are connected to a large public network 120 such as the Internet. The central site network 115 is also connected to the large public network 120 using a concentrator 125 as the interface to the large public network 120. The concentrator 125 stores a profile, profile A 540 and profile B 545, for each of the VPN devices 500, 515.

In operation, the central site 115 and VPN device A 500 form a first VPN 530 in which VPN device A 500 operates in network extension mode. The central site 115 also forms a second VPN 535 with VPN device B 520 in the VPN device B 520 operates in network extension mode. Each VPN device 500, 515 maintains its VPN tunnel 530, 535 to the central site 115, receive its policy from the central site 115 and enables direct addressing from the central site 115 to the stations, 510, 525 on its respective subnet 505, 520.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a virtual private network system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a virtual private network system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or micro code in one or more ROM or RAM or PROM chips or as an Application Specific Integrated Circuit (ASIC). These software or firmware or other such configurations can be installed onto a computer system, data communications device or other dedicated or general-purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computer-readable medium storing computer-executable instructions that when executed by a computer cause the computer to perform a method, the method comprising:
 establishing a set of Internet Protocol (IP) addresses on a virtual private network (VPN) device operating in a network extension mode, where the set of IP addresses are to be assigned to a set of computing devices located in a subnet for which the VPN device is providing a network extension, and where the set of computing devices are to be made visible and addressable by the VPN device to a network device reachable via a VPN tunnel that traverses a portion of a public network;
 controlling the VPN device to establish the VPN tunnel between the VPN device and the network device;
 controlling the VPN device to provide the set of IP addresses to the network device via the VPN tunnel; and
 controlling a Dynamic Host Configuration Protocol (DHCP) server on the VPN device to assign members of the set of IP addresses to members of the set of devices located in the VPN device subnet.

2. The computer-readable medium of claim 1, the method comprising:
 receiving an address adjustment data from the network device;
 selectively adjusting the set of IP addresses based, at least in part, on the address adjustment data to create a differentiated set of IP addresses, where the differentiated set of IP addresses are distinct from IP addresses associated with other VPN devices and associated subnets previously networked to the network device; and
 selectively controlling the DHCP server on the VPN device to assign members of the differentiated set of IP addresses to members of the set of devices located in the subnet for which the VPN is providing the network extension.

3. The computer-readable medium of claim 1, where at least one member of the set of IP addresses is within a private address range established between the VPN device and a member of the set of computing devices, where the private address range facilitates making the member of the set of computing devices individually addressable from the network device and not addressable from the public network.

4. The computer-readable medium of claim 3, the method comprising:
 controlling the VPN device to communicate the private address range to the network device and selectively adjusting the private address range based on a communication from the network device responsive to the communication of the private address range.

5. The computer-readable medium of claim 1, where controlling the VPN device to establish the VPN tunnel comprises one or more of:
controlling the VPN device to provide a public address of the VPN device for access from the public network;
controlling the VPN device to provide a private address of the VPN device for access from the VPN tunnel;
controlling the VPN device to provide a group name and a group password to facilitate verifying the VPN device; and
controlling the VPN device to provide a user name and a user password to facilitate verifying at least one member of the set of computing devices.

6. An apparatus, comprising:
a memory to store network addresses for a set of clients arranged in a subnet for which the apparatus provides network extension;
a network interface to interface the apparatus to a public network and to a virtual private network (VPN);
a VPN logic to establish the VPN between the apparatus and the network device across the public network; and
a Dynamic Host Configuration Protocol (DHCP) logic to selectively assign a network address to a member of the set of clients, where the VPN logic is to provide the network addresses to the network device through the VPN tunnel.

7. The apparatus of claim 6, where the VPN logic is to receive an address adjustment signal from the network device and where the VPN logic is to selectively adjust the network addresses based, at least in part, on the address adjustment signal.

8. The apparatus of claim 6, where at least one of the network addresses is within a private address range established between the apparatus and a member of the set of clients, where the private address range makes the member of the set of clients individually addressable from the network device and not addressable from the public network.

9. The apparatus of claim 8, where the VPN logic is to communicate the private address range to the network device and is to selectively adjust the private address range based on a communication from the network device responsive to the communication of the private address range.

10. The apparatus of claim 6, where the VPN logic is to:
control the apparatus to provide a public address of the apparatus for access from the public network;
control the apparatus to provide a private address of the apparatus for access from the VPN tunnel; and
control the apparatus to provide verification credentials.

* * * * *